United States Patent
Schunk

(10) Patent No.: US 11,258,315 B2
(45) Date of Patent: Feb. 22, 2022

(54) INDIVIDUAL TOOTH SEGMENT FOR A STATOR OF A DYNAMOELECTRIC ROTATIONAL MACHINE

(71) Applicant: Siemens Aktiengesellschaft, Munich (DE)

(72) Inventor: Holger Schunk, Lendershausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/269,483

(22) PCT Filed: Aug. 16, 2019

(86) PCT No.: PCT/EP2019/072012
§ 371 (c)(1),
(2) Date: Feb. 18, 2021

(87) PCT Pub. No.: WO2020/038839
PCT Pub. Date: Feb. 27, 2020

(65) Prior Publication Data
US 2021/0305857 A1    Sep. 30, 2021

(30) Foreign Application Priority Data
Aug. 23, 2018 (EP) ..................... 18190458

(51) Int. Cl.
*H02K 1/16* (2006.01)
(52) U.S. Cl.
CPC ................... *H02K 1/165* (2013.01)

(58) Field of Classification Search
CPC .......... H02K 1/165; H02K 1/16; H02K 1/148; H02K 1/14
(Continued)

(56) References Cited

U.S. PATENT DOCUMENTS

| | | | | |
|---|---|---|---|---|
| 5,786,651 A | * | 7/1998 | Suzuki | B21K 25/00 310/216.009 |
| 2001/0030483 A1 | * | 10/2001 | Masumoto | H02K 15/024 310/216.008 |

(Continued)

FOREIGN PATENT DOCUMENTS

| DE | 10 2016 218 822 A1 | 3/2018 |
|---|---|---|
| EP | 0 969 581 A2 | 1/2000 |
| JP | 6 103571 B2 | 3/2017 |

OTHER PUBLICATIONS

PCT International Search Report and Written Opinion of International Searching Authority dated Feb. 10, 2019 corresponding to PCT International Application No. PCT/EP2019/072042 filed Aug. 16, 2019.

*Primary Examiner* — Michael Andrews
(74) *Attorney, Agent, or Firm* — Henry M. Feierisen LLC

(57) ABSTRACT

An individual tooth segment includes a tooth head configured for connection in a form-fitting manner to a tooth head of a further individual tooth segment. The tooth head has a first flank formed on a left end of the tooth head as viewed in a radial direction and configured concavely with a first curvature, and a second flank formed on a right end of the tooth head as viewed in the radial direction and configured convexly with a second curvature. The tooth head has a center of area which is a center point of a circular arc of the second curvature of the second flank.

12 Claims, 4 Drawing Sheets

(58) Field of Classification Search
USPC .................. 310/254.1, 216.008, 216.009
See application file for complete search history.

(56) References Cited

U.S. PATENT DOCUMENTS

| | | | |
|---|---|---|---|
| 2002/0125782 A1* | 9/2002 | Peachee | H02K 19/103 |
| | | | 310/166 |
| 2015/0091409 A1 | 4/2015 | Yoshikawa et al. | |
| 2015/0364954 A1* | 12/2015 | Senoo | H02K 1/14 |
| | | | 310/216.009 |
| 2017/0126075 A1* | 5/2017 | Umeda | H02K 15/022 |
| 2019/0013706 A1* | 1/2019 | Suzuki | H02K 1/18 |

* cited by examiner

INDIVIDUAL TOOTH SEGMENT FOR A STATOR OF A DYNAMOELECTRIC ROTATIONAL MACHINE

CROSS-REFERENCES TO RELATED APPLICATIONS

This application is the U.S. National Stage of International Application No. PCT/EP2019/072012, filed Aug. 16, 2019, which designated the United States and has been published as International Publication No. WO 20201038839 A1 and which claims the priority of European Patent Application, Serial No. 19190458.2, filed Aug. 23, 2018, pursuant to 35 U.S.C. 119(a)-(d).

BACKGROUND OF THE INVENTION

The invention relates to an individual tooth segment, an individual tooth, a stator and a dynamoelectric rotational machine.

Dynamoelectric rotational machines, in particular electric motors, may have a s a or which is composed of individual teeth.

Due to manufacturing tolerances, however, the individual teeth can tilt during operation so that a gap is produced in the stator yoke which, for example, impairs a torque ripple of the machine and reduces a performance of the machine.

A reduction in the manufacturing tolerances is either expensive or not possible.

EP 0 969 581 A1 discloses an iron core arrangement in which the magnetic performance, rigidity and mechanical precision of the iron core assembly can be improved. For this purpose, several plate-shaped core segments are arranged one after the other in order to form several first and second core elements. Edge sections of adjacent core segments of the first and the second core element are coupled to one another. The first and the second core element are alternately stacked one above the other in such a way that first intermediate segment positions which are each defined between adjacent first core segments of the first core element are offset from the second intermediate segment positions which are each defined between two adjacent second core segments of the second core element in a longitudinal direction of the first and the second core element, overlap with these edge sections of the respective first and second core segments, which adjoin one another in a lamination direction in which the first and the second core element are laminated.

The core segments of the first and the second core element are rotated relative to each other by the coupling means to form an enclosed or annular configuration.

SUMMARY OF THE INVENTION

The object of the invention is to improve a dynamoelectric rotational machine having individual teeth.

The object is achieved by an individual tooth segment, having a tooth head, the tooth head being designed in such a way that the tooth head can be connected in a form-fitting manner to at least one further tooth head of a further individual tooth segment.

The individual tooth segment is suitable for an individual tooth of a stator of a dynamoelectric machine.

The object is further achieved by an individual tooth, having a plurality of such individual tooth segments.

The object is also achieved by a stator for a dynamoelectric rotational machine, having a plurality of radially arranged individual teeth.

The object is also achieved by a dynamoelectric rotational machine, having such a stator.

Advantageously, an individual tooth segment has precisely one tooth head, precisely one tooth shaft and precisely one tooth base. The individual tooth segment is preferably integral.

The tooth head can also be referred to as a yoke.

In this case, in a form-fitting manner means that the relative movement of two components is blocked by structural details. A form fit can block movements in one or more directions.

The individual tooth segment is preferably a sheet metal. The individual tooth segment is preferably cut out or punched, in particular rolled, from a large sheet of metal.

The individual tooth segment preferably has a material with which a magnetic flux can be conducted. The material is, for example, magnetically soft.

Advantageously, the tooth head can be connected to the other tooth head in an accurately fitting manner, at least essentially taking into account tolerances, in particular manufacturing tolerances.

According to the invention, the tooth head has a first flank and a second flank.

In a further advantageous embodiment of the invention, the first flank is formed on a left end of the tooth head viewed in a radial direction, wherein the second flank is formed on a right end of the tooth head viewed in a radial direction.

In a further advantageous embodiment of the invention, the first flank is concave with a first curvature.

This means that the first flank is curved inwards with the first curvature.

In a further advantageous embodiment of the invention, the second flank is convex with a second curvature.

This means that the first flank is curved outwards with the second curvature.

A curvature is a deviation from a straight course of the respective flank, in particular an arcuate deviation.

In a further advantageous embodiment of the invention, an amount of the first curvature of the first flank corresponds to an amount of the second curvature of the second flank.

This means: the second curvature is decisive for the first curvature.

The embodiment described has the advantage that the tooth head can be connected in a form-fitting manner at its left end and at its right end to a further identically designed tooth head. The individual tooth segments described can be produced in series.

In a further advantageous embodiment of the invention, the first flank is designed as a circular arc, the first curvature being constant.

In a further advantageous embodiment of the invention, the second flank is formed, the second curvature being constant.

The second and thus also the first curvature can preferably be defined by means of a circle with a center point and a radius.

According to the invention, the center of area of the tooth head is a center point of the circular arc of the second flank.

This has the advantage that displacements of the individual teeth have no effects on the performance and power of the dynamo-electric rotational machine. In the case of displacements, no gaps arise between the individual teeth.

Displacements and/or deformations are virtually unavoidable during operation of the machine.

In a further advantageous embodiment of the invention, the first flank has an indentation.

In a further advantageous embodiment of the invention, the second flank has a projection. The described embodiment has the advantage that displacements of the individual teeth and thus gaps between the individual teeth are virtually prevented.

In a further advantageous embodiment of the invention, an amount of a third curvature of the indentation corresponds to an amount of a fourth curvature of the projection. By means of this embodiment, the indentation and projection can be optimally connected in a form-fitting manner.

It is also possible for the individual tooth segment to have a concave flank and an indentation or projection. It is also possible for the individual tooth segment to have a convex flank and an indentation or projection.

The invention offers the advantage that the contour of the flanks can be planned and thus an improvement in the performance of the dynamoelectric rotational machine is achieved without additional costs.

At least two, preferably more than two, individual tooth segments are advantageously packaged into an individual tooth. In a preferred embodiment, an individual tooth has approx. 50 to 100 such individual tooth segments.

The individual tooth segments, which are preferably identical in construction, are preferably arranged congruently one behind the other.

If the individual tooth segments packaged into the individual tooth each have an indentation, the entire individual tooth has a groove.

If the individual tooth segments packaged into the individual tooth each have a projection, the individual tooth has a spline.

If the individual tooth segments packaged into the individual tooth each have a concave first flank, the individual tooth has a concave first flank.

If the individual tooth segments packaged into the individual tooth each have a convex second flank, the individual tooth has a convex second flank.

The individual tooth is preferably electrically insulated. An insulation material is for example a lacquer, in particular a baking lacquer.

Each individual tooth segment preferably has an insulation material.

In an advantageous embodiment of the invention, the individual tooth has a winding. The insulation material is preferably applied to at least one side of the individual tooth segment. The insulation material is preferably applied on both sides.

A winding material, in particular a winding wire, preferably contains copper. However, other conductive winding materials known to a person skilled in the art are also conceivable.

The winding material is preferably coil wire. The winding material is advantageously wound around the tooth shaft.

The individual tooth is preferably first insulated and subsequently wound.

A plurality of the individual teeth is preferably arranged radially to form the stator. A number of the individual teeth is preferably a multiple of 3. Preferably 9 or 12 individual teeth are arranged radially.

A preferred embodiment of the stator is as follows: each individual tooth is insulated and wound with winding wire. The plurality of individual teeth is radially arranged and fixed. The ends of the winding wire are connected by means of at least one circuit board and/or by means of soldering. The individual teeth are preferably welded and inserted into a housing (preferably having aluminum).

The invention has the advantage that manufacturing tolerances of the individual tooth segments can essentially be ignored. If, for example, the individual teeth in the stator assembly rotate, in particular during operation, to the outside in the radial direction or the individual tooth is deformed, a connection of two adjacent individual teeth still exists because of the described design of the flanks. The individual teeth cannot tilt, a gap does not arise in the stator yoke. This has the advantage that a torque ripple can be reduced and high power ensured.

The form-fitting connection preferably results in the stator assembly remaining stable when an individual tooth or a plurality of individual teeth is/are moved.

A dynamoelectric rotational machine is preferably formed by means of the described stator and a rotor.

In an advantageous embodiment, the dynamoelectric rotational machine is designed as a toothed coil motor.

The dynamoelectric rotational machine is preferably a permanently excited synchronous machine.

The dynamoelectric rotational machine according to the invention is particularly suitable for machine tools. It is particularly suitable for all applications requiring high dynamics. For example, the dynamoelectric rotational machine according to the invention can be rapidly accelerated.

Together with a suitable transmitter, the dynamoelectric rotational machine according to the invention can be used for positioning drives and for Pick-and-Place applications such as, for example, the assembly of printed circuit boards.

In an alternative embodiment, the individual tooth segments are produced as a material layer, this production method being disclosed in the patent document with the application number EP18183457.

Individual tooth segments, preferably painted with baking lacquer, are advantageously arranged one above the other in the alternative embodiment and are baked to form the individual tooth segment.

BRIEF DESCRIPTION OF THE DRAWING

The invention is described and explained in more detail with reference to the exemplary embodiments shown in the figures. The figures show.

DETAILED DESCRIPTION OF PREFERRED EMBODIMENTS

Figure 1:
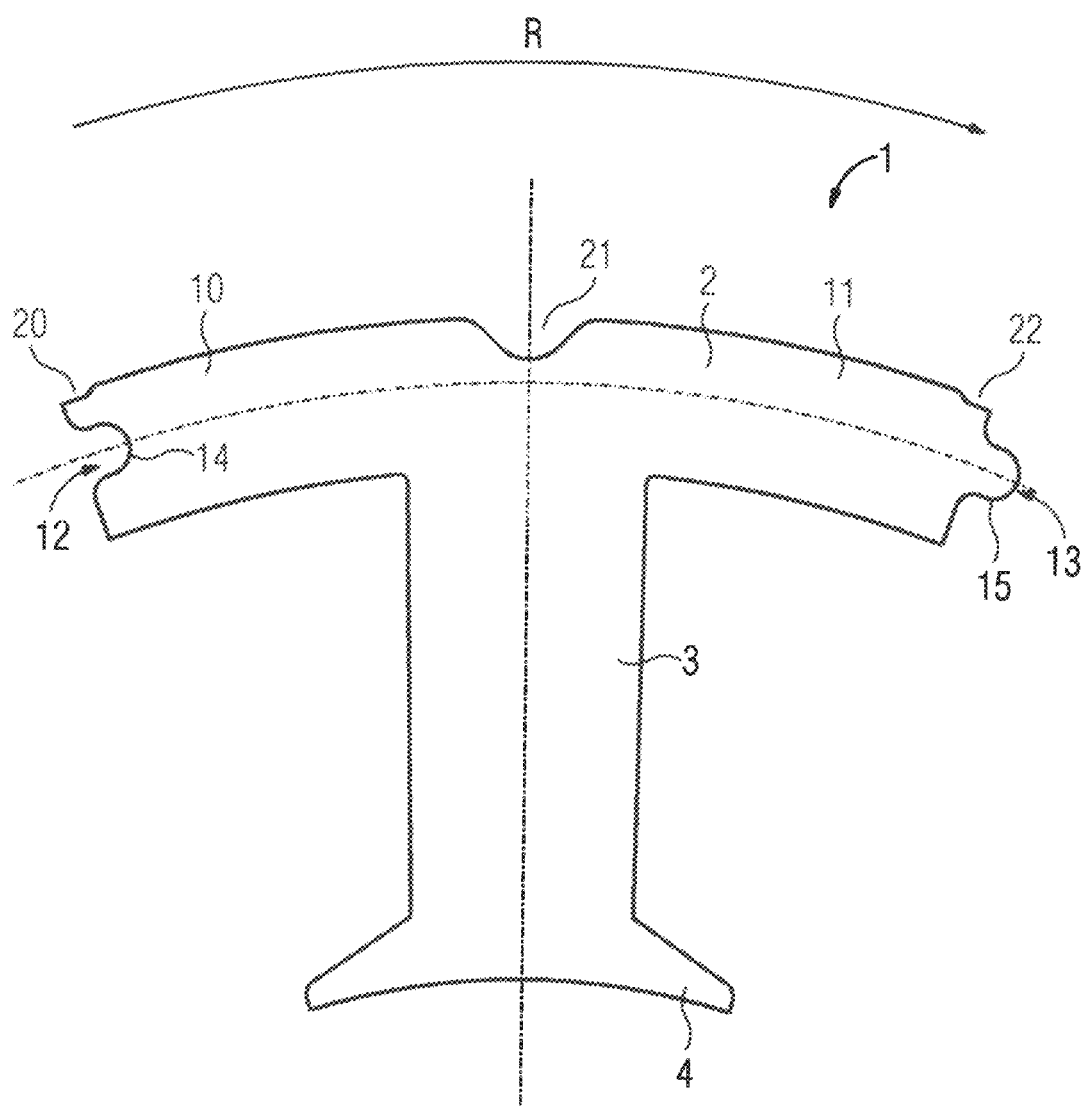
FIG. 1 An embodiment of an individual tooth segment.

FIG. 1 shows an embodiment of an individual tooth segment 1. The individual tooth segment 1 has a tooth head 2, a tooth shaft 3 and a tooth base 4. The tooth head 2 has a first flank 10 on its left end (viewed in the direction of rotation R) and a second flank 11 on its right end.

In addition, the tooth head 2 has an indentation 12 and a projection 13. The indentation 12 has a third curvature 14. The projection 13 has a fourth curvature 15. The curvatures 14 and 15 are designed in such a way that hi each case one individual tooth segment 1 which is identical hi construction can be arranged on the left and right in the radial direction R and can be connected in a form-fitting manner to the individual tooth segment 1 shown in the figure.

The figure also shows the recesses 20, 21 and 22 which are provided, for example, for a welding material for the later welding of the individual tooth segments 1. In particular, the recess 21 can also be used for casting a stator formed by means of the individual tooth segments 1.

Figure 2:
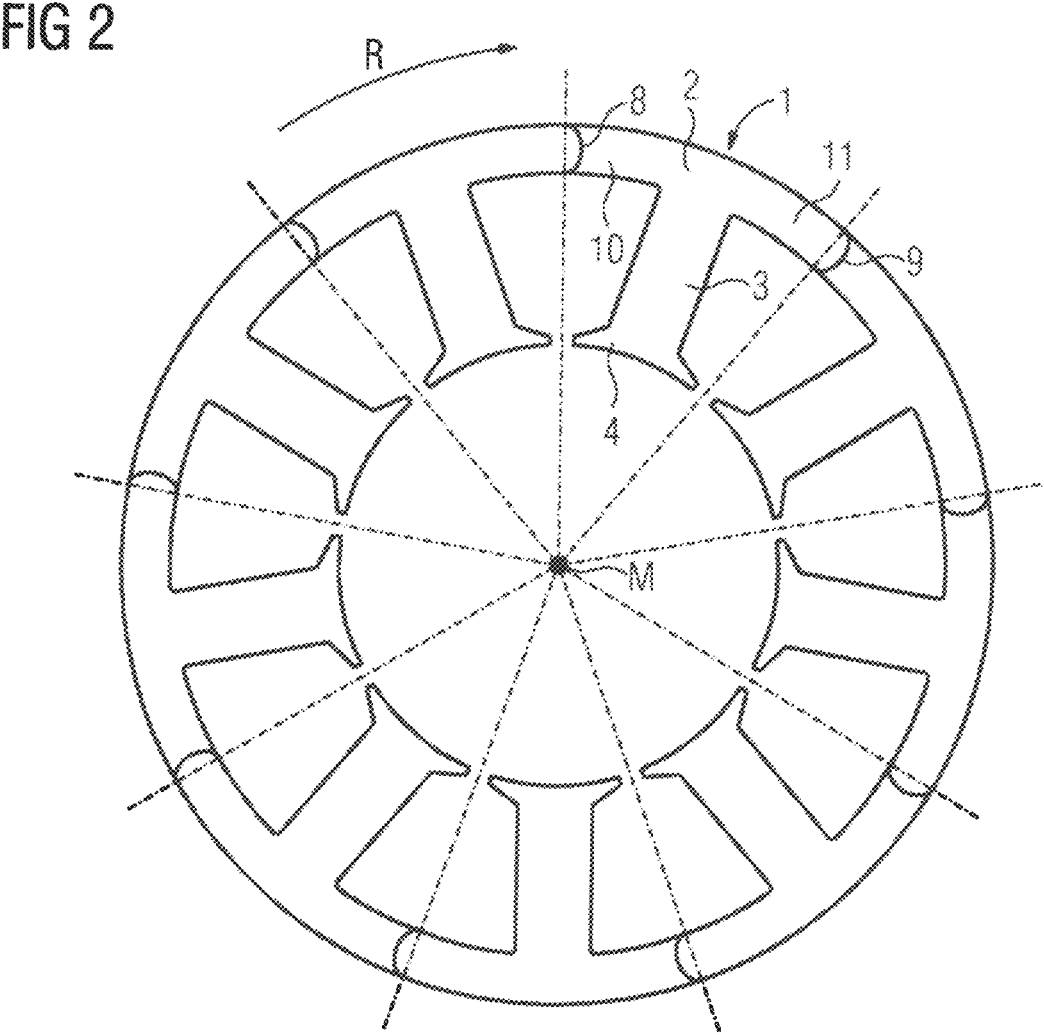
FIG. 2 An embodiment of a plurality of radially arranged individual tooth segments, FIG. 3 A representation for determining a radius of the circular arc, FIG. 4 An embodiment of an individual tooth, and FIG. 5 An embodiment of a dynamoelectric rotational machine.

FIG. 2 shows an embodiment of a plurality of radially arranged individual tooth segments 1.

The figure shows nine individual tooth segments 1 which are arranged radially around a center point M. The first flank 10 on the left end of the tooth head 2 is concave and has a first curvature 8. The second flank 11 on the right end is convex and has a second curvature 9.

The figure shows that the nine individual tooth segments 1 are identical in construction and each individual tooth segment 1 is connected in a form-fitting manner on its left and on its right end viewed in a radial direction to one further individual tooth segment in each case. In this way, a round stator is formed.

Figure 3:
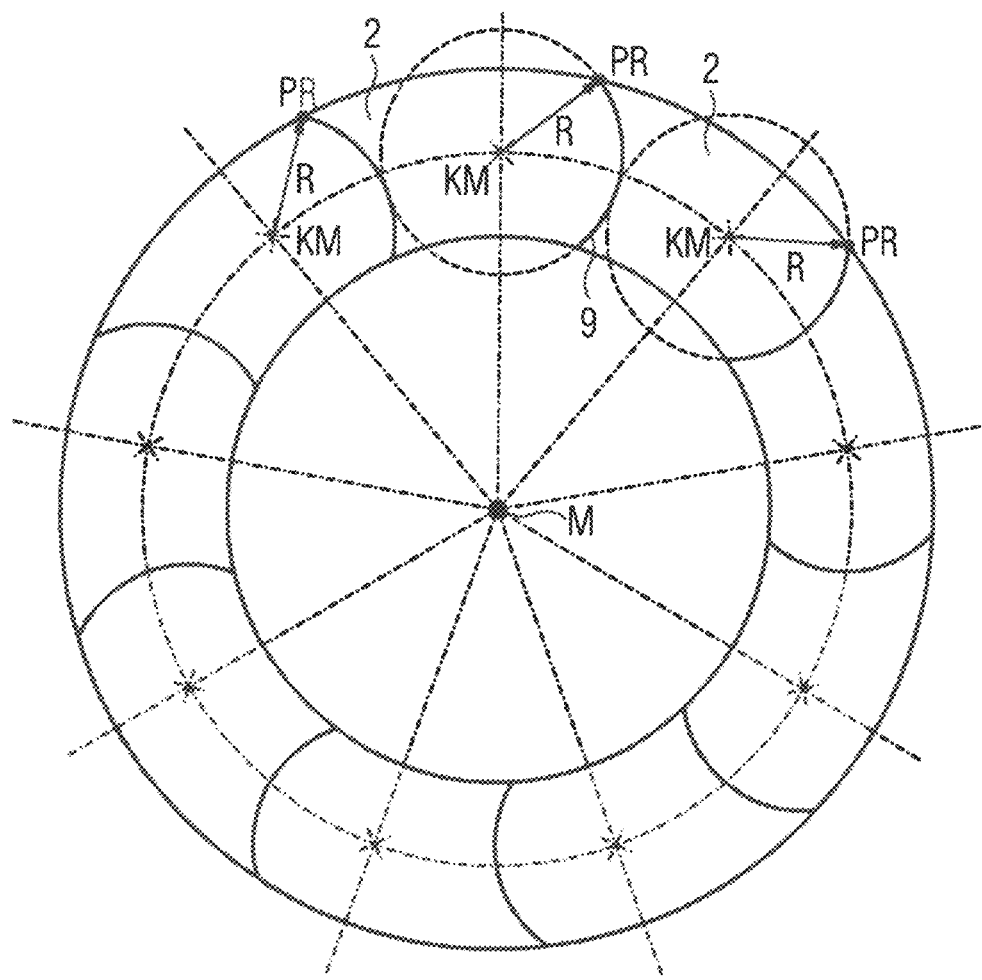

FIG. 3 shows a representation for determining a radius of a circular arc.

The curvature 9 is—just like the curvature 8—constant. The second flank 11 is in the form of a circular arc in the figure. A center point of the circular arc in the figure is a center of area KM of the tooth head 2. The curvature 9 is described by the center of area KM and a radial external end PR of the tooth head on the right end of the tooth head 2.

As already described, the first flank on the left end of the tooth head 2 is concave and thus corresponds to a negative of the convex flank.

Figure 4:
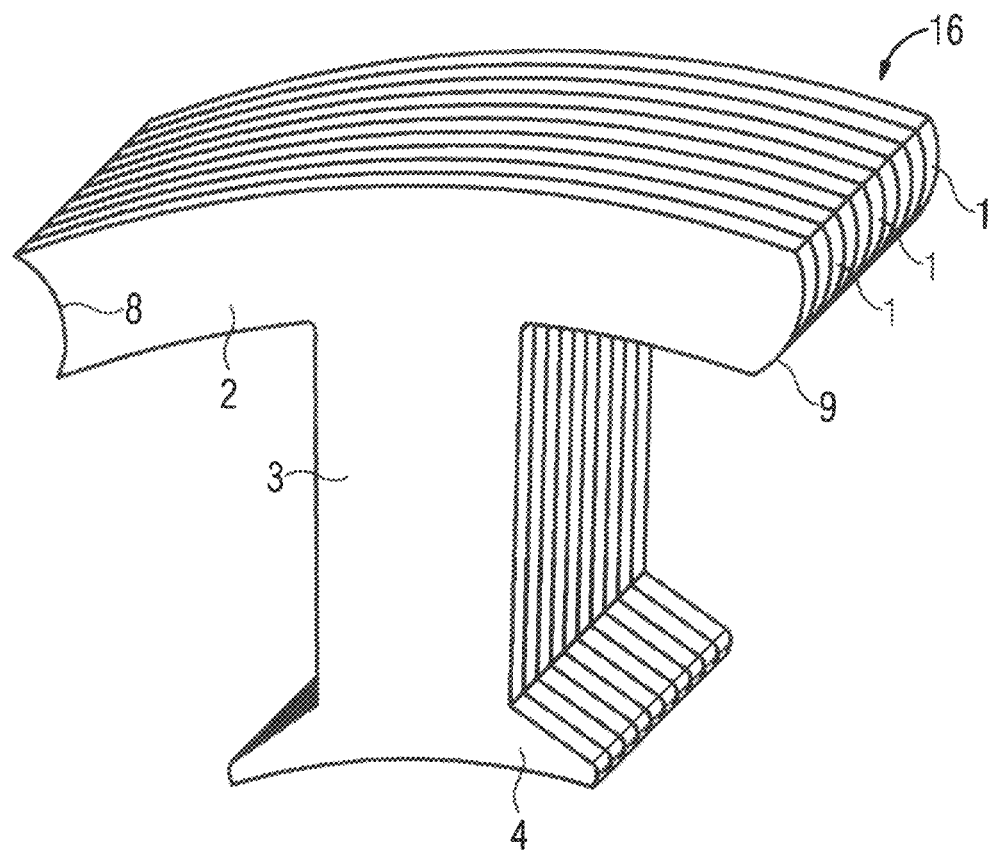

FIG. 4 shows an embodiment of an individual tooth 16.

In the figure a plurality of individual tooth segments 1 are arranged one behind the other (in other words: stacked) to form the individual tooth 16.

The figure also shows an embodiment of the individual tooth 16 with a convex flank and a concave flank.

Figure 5:
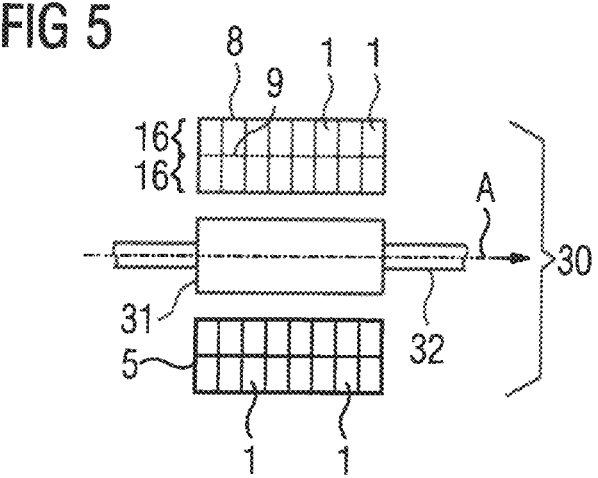

FIG. 5 shows an embodiment of a dynamoelectric rotational machine 30.

The dynamoelectric rotational machine 30 has a stator 5 and a rotor 31 which is connected to a shaft 32.

In the figure, the rotor 31 is designed in such a way that it rotates within the stator. However, an external rotor is also conceivable.

As shown in the figure, the individual tooth segments 1 are preferably arranged along an axis of rotation A.

The figure shows how the individual tooth segments 1 and the individual teeth 16 formed thereof are arranged.

The invention claimed is:

1. An individual tooth segment for a stator of a dynamoelectric rotational machine, comprising a tooth head configured for connection in a form-fitting manner to a tooth head of a further said individual tooth segment, said tooth head including a first flank formed on a left end of the tooth head as viewed in a radial direction and configured concavely with a single constant first curvature extending between an inside diameter of the first flank and an outside diameter of the first flank, and a second flank formed on a right end of the tooth head as viewed in the radial direction and configured convexly with a single constant second curvature identical to the single constant first curvature and extending between an Inside diameter of the second flank and an outside diameter of the second flank, said tooth head having a center of area which is a center point of a circular arc of the single constant second curvature of the second flank.

2. The individual tooth segment of claim 1, further comprising a tooth shaft connected to the tooth head, and a tooth base connected to the tooth shaft.

3. The Individual tooth segment of claim 2, wherein the tooth base is arranged at a first location in relation to a rotor, and wherein the tooth head is arranged at a second location in relation to the rotor, with the first location being radially closer to the rotor than the second location which is arranged radially further away from the rotor.

4. The individual tooth segment of claim 1, wherein the first flank is designed as a circular arc.

5. The individual tooth segment of claim 1, wherein the second flank is designed as a circular arc.

6. The individual tooth segment of claim 1, wherein the individual tooth segment and the further said individual tooth segment are arranged radially around a center point, with the tooth base arranged radially closer to the center point than the tooth head which is arranged radially further from the center point.

7. An individual tooth for a stator of a dynamoelectric rotational machine, comprising a plurality of individual tooth segments, each of the Individual tooth segments comprising a tooth head configured for connection in a form-fitting manner to a tooth head of a further one of the individual tooth segments, said tooth head including a first flank formed on a left end of the tooth head as viewed in a radial direction and configured concavely with a single constant first curvature extending between an inside diameter of the first flank and an outside diameter of the first flank, and a second flank formed on a right end of the tooth head as viewed in the radial direction and configured convexly with a single constant second curvature Identical to the single constant first curvature and extending between an inside diameter of the second flank and an outside diameter of the second flank, said tooth head having a center of area which is a center point of a circular arc of the single constant second curvature of the second flank.

8. The Individual tooth of claim 7, further comprising a winding.

9. A stator for a dynamoelectric rotational machine, said stator comprising a plurality of radially arranged individual teeth, each of the Individual teeth comprising a plurality of Individual tooth segments, each of the individual tooth segments comprising a tooth head configured for connection in a form-fitting manner to a tooth head of a further said individual tooth segment, said tooth head including a first flank formed on a left end of the tooth head as viewed in a radial direction and configured concavely with a single constant first curvature extending between an inside diameter of the first flank and an outside diameter of the first flank, and a second flank formed on a right end of the tooth head as viewed in the radial direction and configured convexly with a single constant second curvature identical to the single constant first curvature and extending between an inside diameter of the second flank and an outside diameter of the second flank, said tooth head having a center of area which is a center point of a circular arc of the single constant second curvature of the second flank.

10. A dynamoelectric rotational machine, comprising a stator comprising a plurality of radially arranged Individual teeth, each of the Individual teeth comprising a plurality of individual tooth segments, each of the individual tooth segments comprising a tooth head configured for connection in a form-fitting manner to a tooth head of a further said individual tooth segment, said tooth head including a first flank formed on a left end of the tooth head as viewed in a radial direction and configured concavely with a single constant first curvature extending between an inside diameter of the first flank and an outside diameter of the first flank, and a second flank formed on a right end of the tooth head as viewed in the radial direction and configured convexly with a single constant second curvature identical to the single constant first curvature and extending between an inside diameter of the second flank and an outside diameter of the second flank, said tooth head having a center of area which is a center point of a circular arc of the single constant second curvature of the second flank.

11. The dynamoelectric rotational machine of claim 10, designed as a toothed coil motor.

12. The dynamoelectric rotational machine of claim 10, further comprising a rotor interacting with the stator, wherein the tooth base is arranged at a first location in relation to the rotor, and wherein the tooth head is arranged at a second location in relation to the rotor, with the first location being radially closer to the rotor than the second location which is arranged radially further away from the rotor.

* * * * *